(12) United States Patent
Dugas et al.

(10) Patent No.: US 7,710,675 B2
(45) Date of Patent: May 4, 2010

(54) APPARATUSES AND METHODS FOR PRE-ERASING DURING MANUFACTURE OF MAGNETIC TAPE

(75) Inventors: Matthew P. Dugas, St. Paul, MN (US); Theodore A. Schwarz, Woodbury, MN (US)

(73) Assignee: Advanced Research Corporation, White Bear, MN (US)

( * ) Notice: Subject to any disclaimer, the term of this patent is extended or adjusted under 35 U.S.C. 154(b) by 0 days.

(21) Appl. No.: 12/271,203

(22) Filed: Nov. 14, 2008

(65) Prior Publication Data

US 2009/0067087 A1 Mar. 12, 2009

Related U.S. Application Data

(60) Division of application No. 11/838,006, filed on Aug. 13, 2007, now Pat. No. 7,576,949, which is a continuation of application No. 10/768,719, filed on Jan. 30, 2004, now Pat. No. 7,283,317.

(51) Int. Cl.
*G11B 5/09* (2006.01)
*G11B 15/18* (2006.01)

(52) U.S. Cl. .......................................... 360/48; 360/71
(58) Field of Classification Search ........................ None
See application file for complete search history.

(56) References Cited

U.S. PATENT DOCUMENTS

| | | | |
|---|---|---|---|
| 5,606,478 A | 2/1997 | Chen et al. | |
| 5,689,384 A | 11/1997 | Albrecht et al. | |
| 6,236,525 B1 | 5/2001 | Cates et al. | |
| 6,269,533 B2 | 8/2001 | Dugas | |
| 6,496,328 B1 | 12/2002 | Dugas | |
| 6,650,496 B2 | 11/2003 | Nozieres et al. | |
| 6,801,391 B2 | 10/2004 | Sugawara et al. | |
| 6,873,487 B2 | 3/2005 | Molstad | |
| 6,970,312 B2 | 11/2005 | Yip et al. | |
| 6,989,950 B2 | 1/2006 | Ohtsu | |
| 7,142,388 B2 | 11/2006 | Tateishi et al. | |
| 7,283,317 B2 | 10/2007 | Dugas et al. | |
| 7,515,374 B2 * | 4/2009 | Nakao | 360/77.12 |
| 2005/0052779 A1 | 3/2005 | Nakao et al. | |
| 2005/0219734 A1 | 10/2005 | Rothemal et al. | |

FOREIGN PATENT DOCUMENTS

JP 2005 063623 A 3/2005

* cited by examiner

*Primary Examiner*—K. Wong
(74) *Attorney, Agent, or Firm*—Dorsey & Whitney LLP; Nate Witzany, Esq.

(57) ABSTRACT

The present invention relates to direct current ("DC") pre-erasing servo channels of a magnetic tape prior to writing servo data in a servo channel. The present invention particularly relates to those servo recordings which were written with a uni-polar current waveform. The DC pre-erase is performed using a uni-polar direct current of a polarity that is opposite to the polarity of the direct current used to write the servo data. This pre-erase may be done with one or more heads. Also, as will be described, the pre-erase of a servo channel and writing to a servo channel may be done by making two passes over a single head or by using two or more heads to perform both steps. Also, it is within the scope of the present invention to have the heads mounted on a single mount or have the heads on separate mounts and on separate tape decks.

8 Claims, 12 Drawing Sheets

FIG. 1
Typical Servoed Tape Organization

APPARATUSES AND METHODS FOR PRE-ERASING DURING MANUFACTURE OF MAGNETIC TAPE

CROSS-REFERENCE TO RELATED APPLICATIONS

This application is a divisional of U.S. patent application Ser. No. 11/838,006, filed on Aug. 13, 2007, as U.S. Pat. No. 7,576,949 on Aug. 18, 2009, which is a continuation of U.S. patent application Ser. No. 10/768,719, filed on Jan. 30, 2004, issued as U.S. Pat. No. 7,283,317, the contents of each of which are incorporated herein by reference.

TECHNICAL FIELD

The present invention relates to apparatuses and methods for use in the manufacture of magnetic tape. In particular, the present invention relates to apparatuses and methods for pre-erasing a servo channel of a magnetic tape.

BACKGROUND OF THE INVENTION

Magnetic tape as a data storage medium requires the ability to effectively write and read data to data tracks of the magnetic tape; many such data tracks typically extend linearly along the length of tape and, in part, define tape data storage density. In addition, for providing a controlled movement of tape reading and/or writing heads with respect to the data track, servo tracks, which also extend linearly along the length of tape are commonly used. Servo tracks are typically written in such a way as to span the tape in an efficient manner that maximizes the number of data tracks and minimizes the number of servo tracks for a given tape system.

A servo track contains servo data and is read by a servo read head. This information is used to determine the relative position of the servo read head with respect to the magnetic media in a translating direction (i.e., movement across the width of the tape). This is also called the cross track direction. To improve positioning of the tape reading and/or writing heads on a magnetic tape, apparatuses and methods of manufacture to create a servo channel that enables the servo data to be read more effectively would be helpful. The present invention addresses apparatuses and methods to improve a servo control system.

BRIEF SUMMARY OF THE INVENTION

The present invention relates to direct current ("DC") pre-erasing servo channels of a magnetic tape prior to writing servo data in a servo channel. The present invention particularly relates to those servo recordings which were written with a uni-polar current waveform. The DC pre-erase is performed using a uni-polar direct current of a polarity that is opposite to the polarity of the direct current used to write the servo data. This pre-erase may be done with one or more heads. Also, as will be described, the pre-erase of a servo channel and writing to a servo channel may be done by making two passes over a single head or by using two or more heads to perform both steps. Also, it is within the scope of the present invention to have the heads mounted on a single mount or have the heads on separate mounts and on separate tape decks.

In one embodiment, the present invention relates to a magnetic tape comprising a substrate and a magnetic layer, the magnetic tape having at least one direct current pre-erased servo channel that includes servo data.

In another embodiment, the present invention relates to a magnetic tape having at least one servo channel that is direct current pre-erased and has servo data written in the at least one servo channel.

The magnetic tape is made by a method comprising writing a servo pattern using a uni-polar direct current of a particular pulse train. Prior to writing a servo pattern, erasing the servo channel of the magnetic tape by applying a direct current of a substantially opposite polarity to that of the servo write current pulse sequence.

The present invention also relates to an apparatus for use in pre-erasing magnetic tape, comprising a housing supporting at least two heads, wherein at least one of the two heads includes a gap pattern to direct current pre-erase the servo channels on the magnetic tape, wherein the other of the two heads includes a gap pattern for recording the servo channel that is written after the pre-erase has been first recorded.

The present invention further relates to an apparatus for use in pre-erasing magnetic tape, comprising a compound substrate having at least a first substrate and a second substrate, wherein the first substrate includes at least one servo pattern and the second substrate includes at least one direct current pre-erase pattern.

DETAILED DESCRIPTION

The present invention relates to apparatuses and methods used in manufacturing magnetic tape. In particular, the present invention relates to manufacture of magnetic tape that includes servo data in one or more servo channels, where one or more servo channels has been pre-erased with a uni-polar signal prior to the servo data being written in a servo channel. Pre-erasing a servo channel with direct current enables the servo read signal representing the uni-polar written servo pattern to be stronger than a servo read signal in a similar servo channel that is not pre-erased. As such, pre-erasing the servo channel during the manufacture and formatting of the magnetic tape will provide benefits by increasing the signal to noise ration of the servo read signal. This in turn can lead to higher areal data storage densities for the magnetic tape. However, it is important to note that the response of a magnetoresistive ("MR") head to this technique may be too strong and result in distortion and non-linear servo read signals. Hence this technique is to be used when the media thickness and M.sub.rt ratio has become smaller in more aggressive higher density products and when using such a technique will not overdrive the MR servo read head. Since the result of this technique is to increase the servo read signal, it is important to not use it if it will send the read head into a non-linear response region. On the other hand, as areal densities are ever increasing and typically accompanying this the M.sub.rt ratio is decreasing, the use of this technique may prove beneficial in certain servo systems as tape thicknesses continue to decrease.

Figure 1:
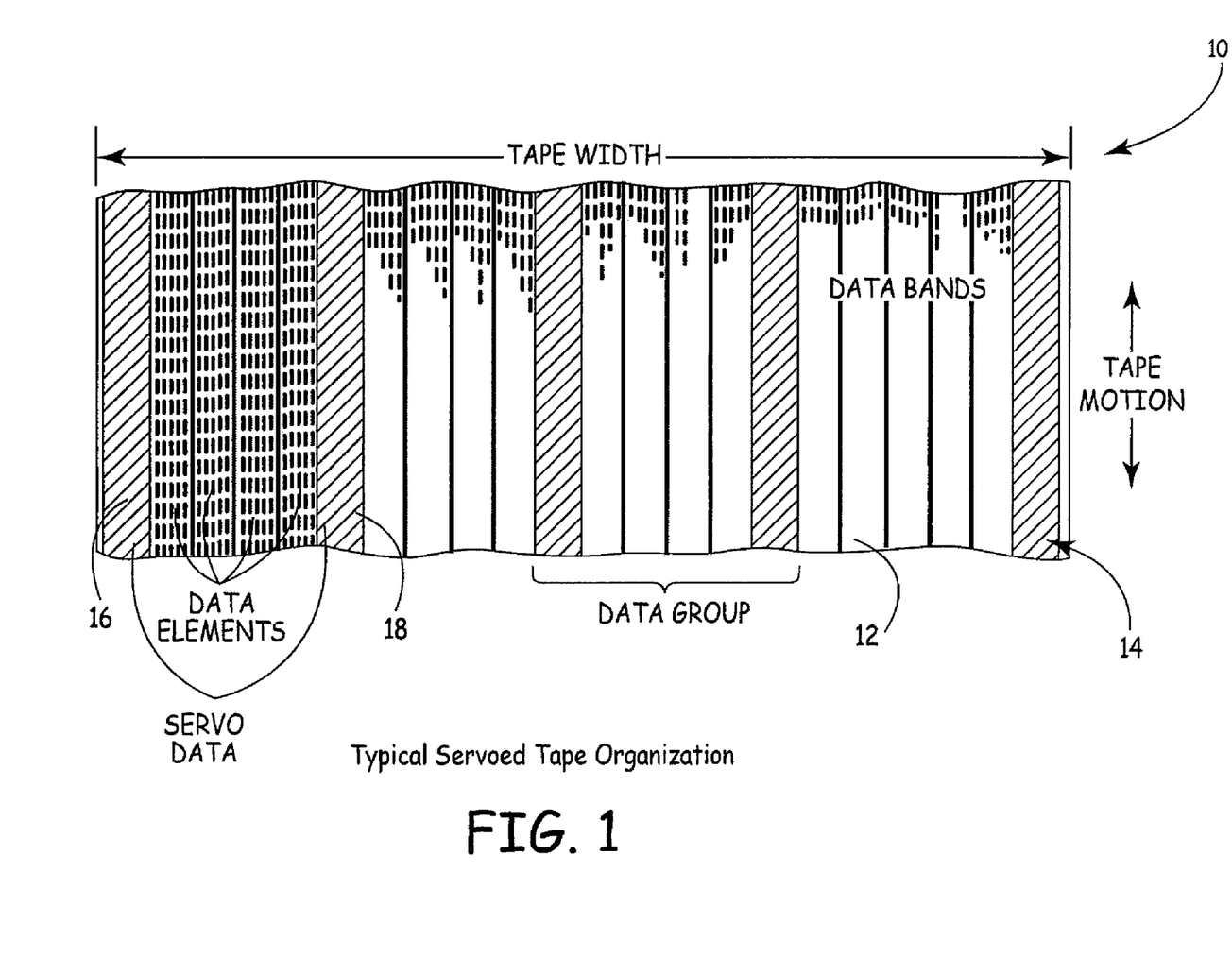
FIG. 1 shows a typical servo track and data track organization on the tape.

FIG. 1 shows a magnetic tape 10 having data bands or data tracks 12 (also, may be referred to as data channels) and servo bands or servo tracks 14 (also may be referred to servo channels). The data tracks 12 would be the portion of tape 10 to which data elements 16 would be written and from which data elements 16 would be read. Similarly, servo tracks 14 would include servo data 18 which are written into the servo track during manufacture of the magnetic tape 10. This servo data 18 is used by the servo control system to help properly position the read and write heads with respect to the data tracks 12. The present invention relates to pre-erasing servo tracks 14 with a direct current or uni-polar pre-erase signal prior to writing a uni-polar servo pattern of the opposite polarity in the servo track 14.

In the preferred embodiment, only the servo channels 14 of a magnetic tape 10 are pre-erased by applying a uni-polar, direct current erase signal through a precise gap pattern in the head. A uni-polar servo pattern is then written upon the pre-erased servo channel but in the opposite polarity. The servo pattern may be timing based or amplitude based or a combination of both. However, the present invention will typically be used with a time based pattern as timing patterns are typically uni-polar and amplitude patterns are typically bi-polar. On bi-polar current written or recorded servo channels 14, the technique is less effective in increasing the signal-to-noise ("SNR") of the servo read system.

In manufacturing magnetic tape 10, the DC pre-erase and the writing of a servo pattern may be accomplished using two or more heads or using one head. For instance, in one embodiment, a portion of the magnetic tape 10 is first passed over a head to perform a DC erase of servo channels 14 of the magnetic tape 10 and then another head is used to write a servo pattern into the servo channels 14 of the magnetic tape 10. Alternatively, the same head may be used to perform a DC erase of the servo channels 14 on a magnetic tape 10 and then to write a servo pattern in the servo channels 14 of the magnetic tape 10. That is, in this embodiment, the magnetic tape 10 is passed over the head to perform a DC erase of the servo channels 14. A pulse is applied through the pattern in the head to DC erase the servo channels 14 of the magnetic tape 10. Then, the tape 10 is passed over the head a second time to write a servo pattern into the servo channels 14 of the magnetic tape 10.

Figure 2:
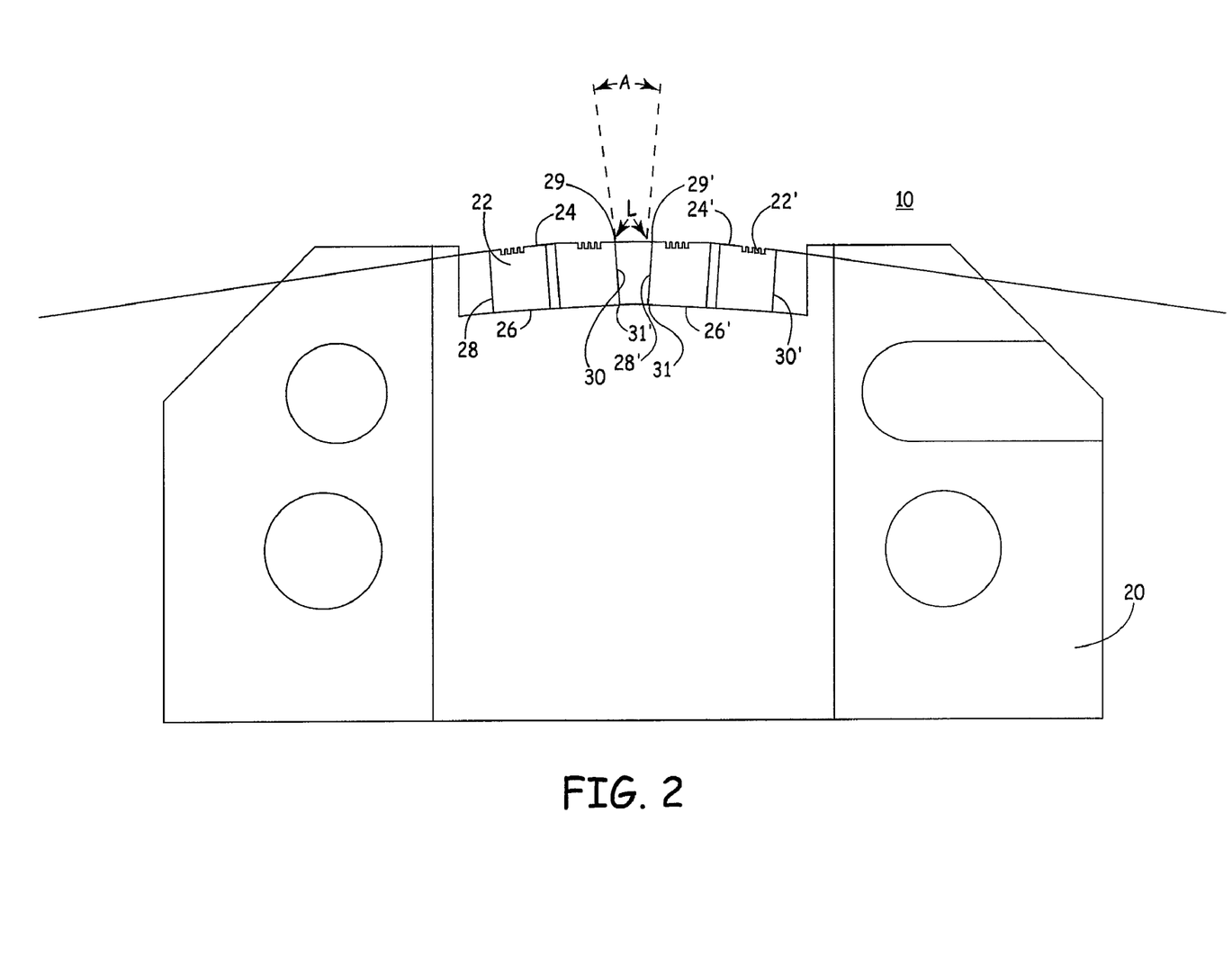
FIG. 2 is a schematic drawing of one embodiment of the present invention showing a housing supporting two heads with magnetic tape extending over the heads, where one of the heads is used to pre-erase with direct current the servo channels of a magnetic tape and the other is used to record the servo pattern onto the pre-erase servo channels.
Figure 12:
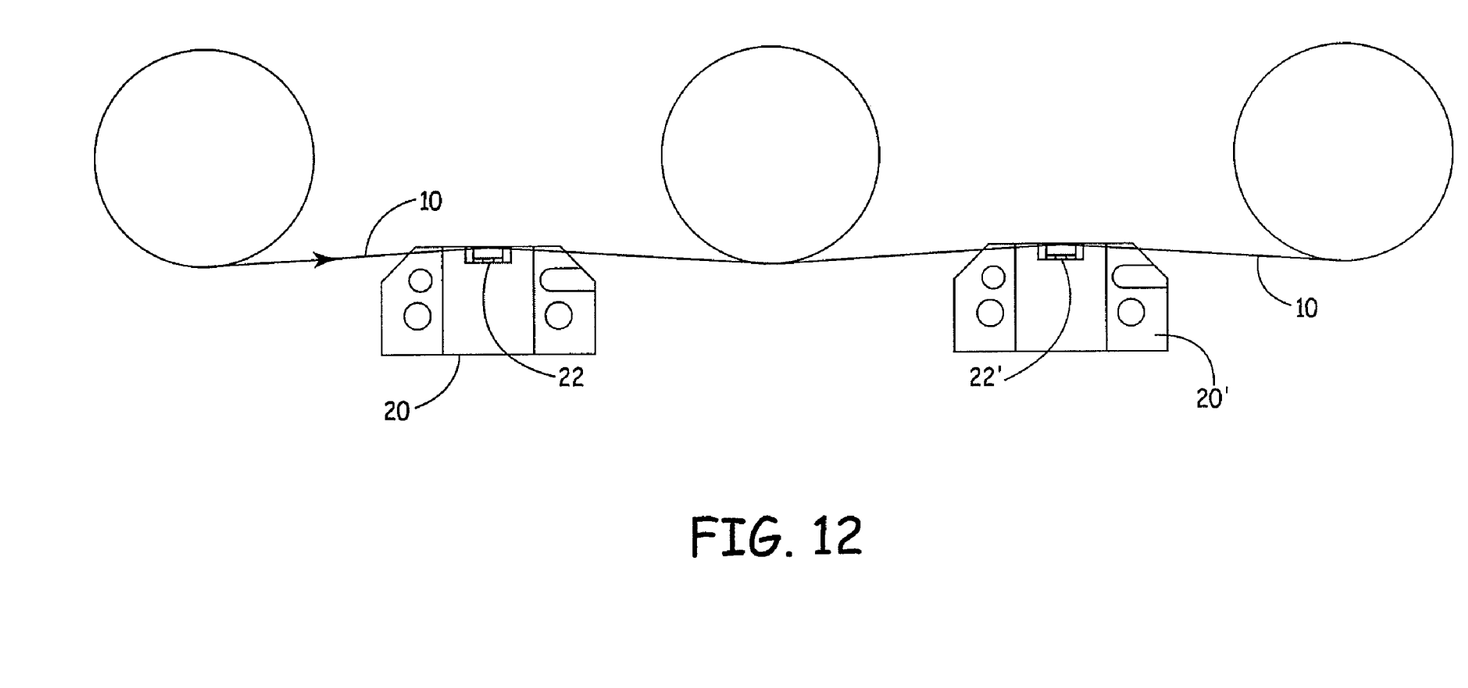
FIG. 12 is a schematic drawing of one embodiment of the present invention showing a first housing supporting one head with the magnetic tape extending over the head, where the head is used to pre-erase with direct current the servo channels of a magnetic tape and a second housing supporting one head with magnetic tape extending over the head, where the head is used to write servo data in the servo channel of the magnetic tape.

In one embodiment, two heads are used and are mounted into a housing so that an efficient one pass servo formatting system may be used. This embodiment is shown in FIG. 2. However, each head may be separately supported by a separate housing or even a separate tape deck (as shown in FIG. 12).

Figure 3:
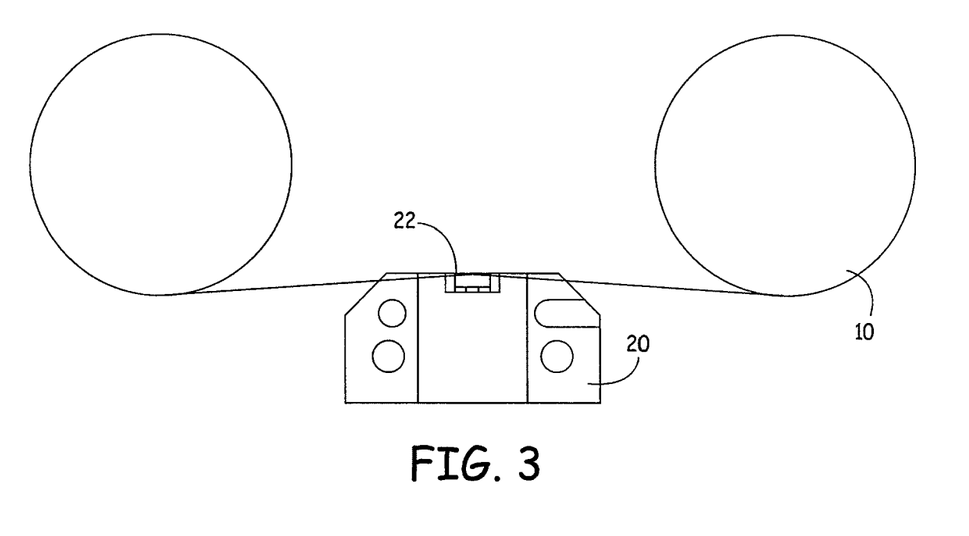
FIG. 3 is a schematic drawing of one embodiment of the present invention showing a housing supporting one head with the magnetic tape extending over the head, where the head is used to pre-erase with direct current the servo channels of a magnetic tape.

With reference to FIGS. 2 and 3, embodiments of an apparatus for use in DC pre-erasing a servo channel 14 of a magnetic tape 10 will be described. FIG. 2 shows a housing 20 with magnetic tape 10 extending across the two heads 22, 22'. As shown in FIG. 2, the embodiment includes a housing 20 that supports a first head 22 and a second head 22'. The heads have a first surface 24, 24', a second surface 26, 26', a first side surface 28, 28', and a second side surface 30, 30'. The first surface 24, 24' is in contact with the magnetic tape 10. The second surface 26, 26' of the heads is attached to and supported by the housing 20. In one embodiment, the heads 22, 22' are mounted to the housing an epoxy. However, the heads may be mounted using any suitable means.

The heads 22 and 22' are disposed side-by-side separated by a predetermined distance L. As shown in FIG. 2, in one embodiment, the heads 22 and 22' are spaced apart approximately 1.0 millimeters ("mm") around the top edge 29, 29' (i.e., toward the first surface 24) and spaced apart approximately 0.80 mm at the bottom edge 31, 31' (i.e., toward the second surface 26). It will be appreciated that while the distance between the heads is specified, other distances may be used. Similarly, the angle A formed between the two heads may be varied and even flat contours may be used. While FIG. 2 shows the heads 22 and 22' not spaced such that the sides 30, 28' are parallel to each other, the heads may be spaced in such a manner that the sides 30, 28' of the first and second heads 22 and 22' are substantially parallel to each other in the vertical direction as shown.

Any type of head may be used in the dual head configuration including, but not limited to thin film heads, ferrite based heads, and surface thin film heads. For instance, the first and second heads 22 and 22' may be heads with low inductance, ferrite sub-gap substrate surface film head structures of the type described in U.S. Pat. No. 6,496,328, which is hereby incorporated by reference in its entirety, a surface thin-film head of the type disclosed in U.S. Pat. No. 6,269,533, which is hereby incorporated by reference in its entirety, or a ferrite metal-in-gap ("MIG") head. Any combination of these types of heads may be used when using two or more head in implementing an embodiment of the present invention. It will be noted that one head will be optimized as an erase head and the other head will be optimized as a servo write head.

Figure 10:
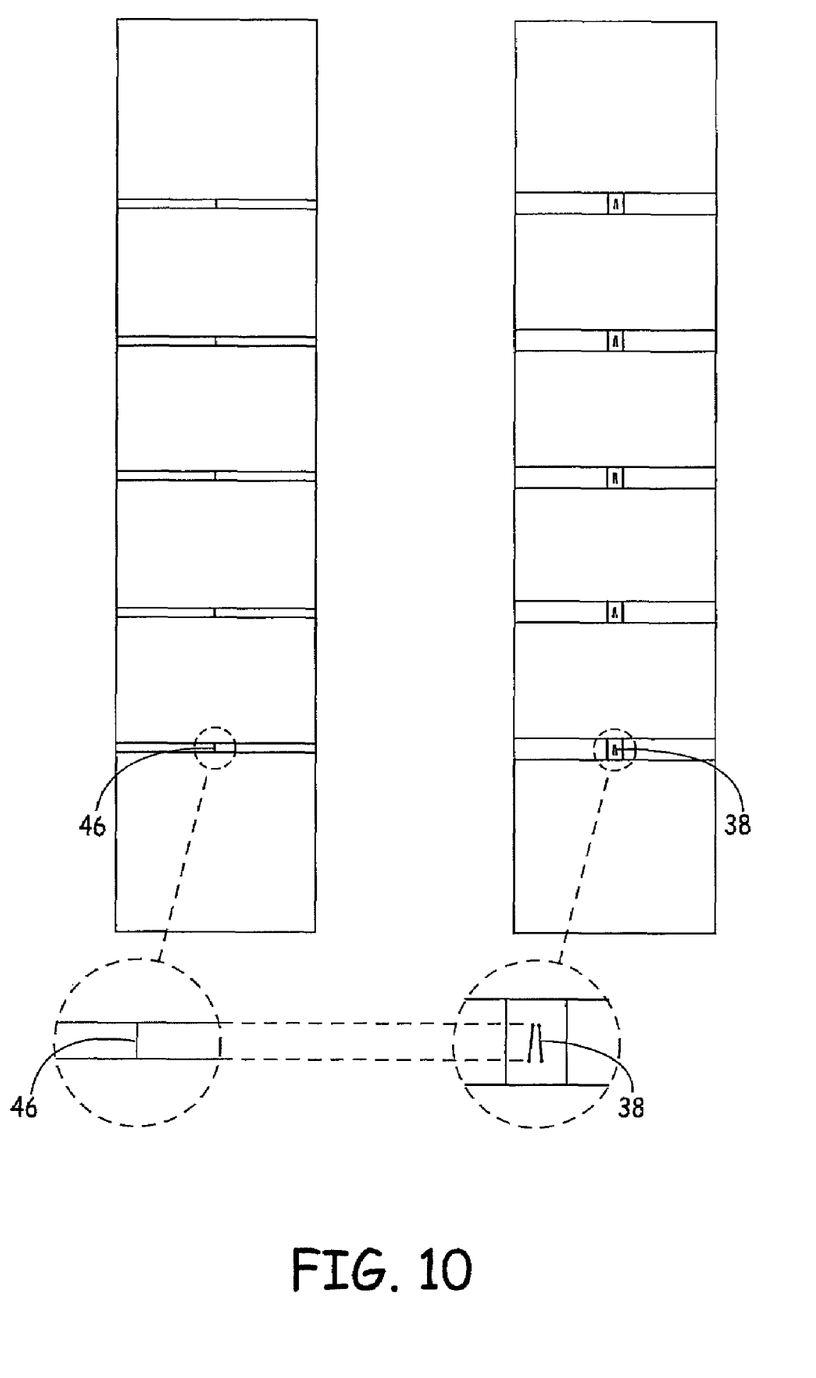
FIG. 10 shows a two head configuration in which one head is a ferrite MIG head having a gap pattern that would be used to DC pre-erase the servo channel and the other head is a surface thin film head using the low inductance, ferrite sub-gap substrate having a timing based servo gap pattern that would write a timing based pattern onto the servo channel on a magnetic tape.

In one embodiment of the dual configuration (as shown in FIG. 10), a ferrite MIG head or a surface thin film head with a pattern would be used to perform the DC erase and a surface thin film head using the low inductance, ferrite sub-gap substrate surface film head with a time base servo pattern would be used to write a servo pattern on the servo channel of the magnetic tape. FIG. 10 shows a ferrite MIG head with a pre-erase gap 46 to perform a DC erase with a surface thin film head having gap for an amplitude or a time based servo pattern for writing to a servo channel 14. As shown in FIG. 10, the width of the pre-erase gap is substantially the same as the width of the servo pattern.

The housing 20 may be formed from any appropriate material including metal. The housing 20 is milled to position the heads 22, 22' to the housing. Furthermore, it will be appreciated that while FIG. 2 shows a housing that includes two heads, a housing having more than two heads is within the scope of the present invention.

FIG. 3 shows a housing mount 20 that has a first head 22. This embodiment may be used when the heads for performing the DC pre-erase on the servo channels 14 and writing the servo patterns on the servo channels 14 are located on different tape decks or this embodiment may be used when the same head is used to perform both the DC erase on one pass and write the servo data 18 on the servo track 14 on a second pass. FIG. 12 shows a first housing 20 supporting a first head 22 with the magnetic tape 10 extending over the head 22, where the head is used to pre-erase with direct current the servo channels 14 of a magnetic tape 10 and a second housing 20' supporting a second head 22' with magnetic tape 10 extending over the second head 22', where the second head 22' is used to write servo data in the servo channel 14 of the magnetic tape 10.

Figure 11:
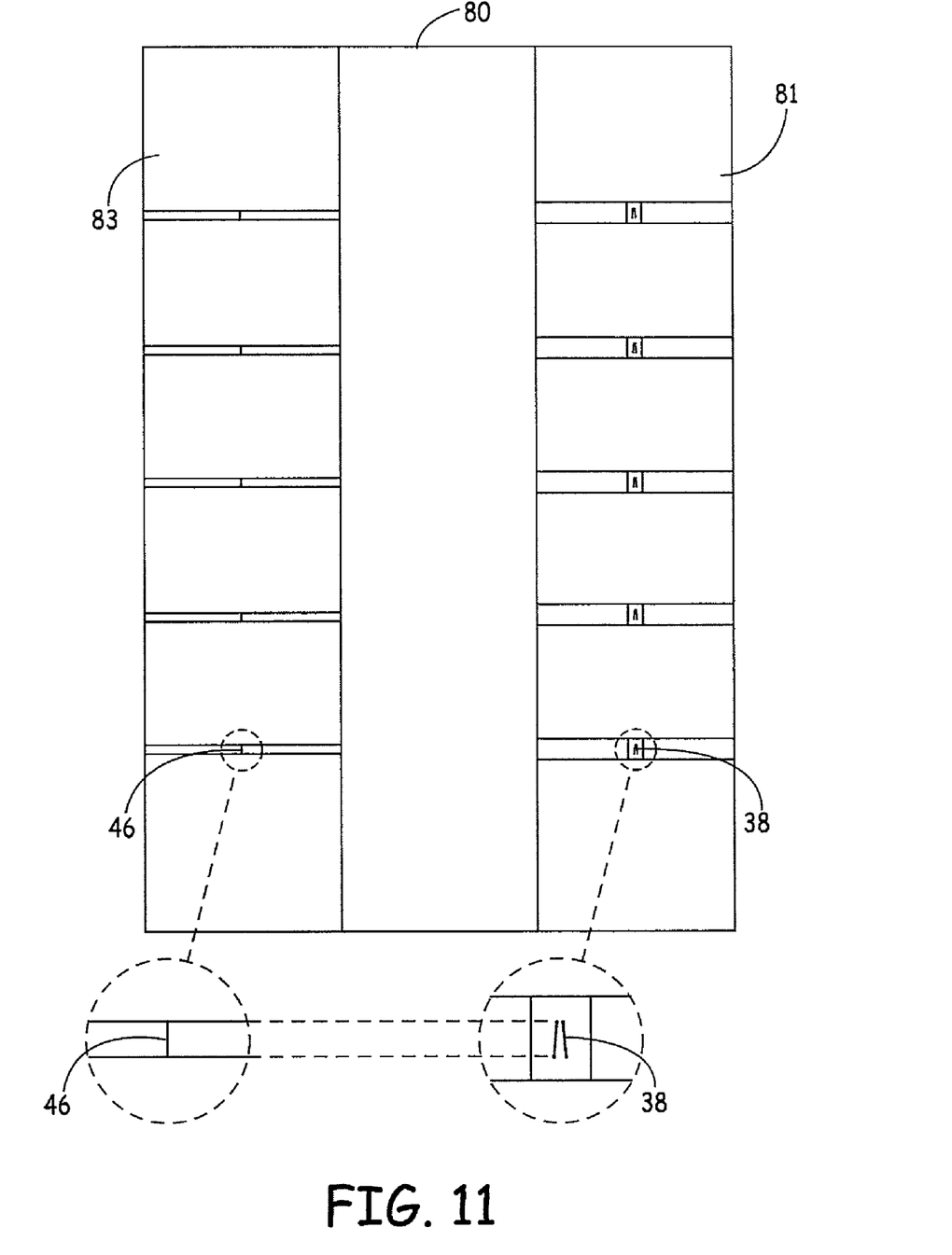
FIG. 11 shows an embodiment of the present invention using a compound substrate.

FIG. 11 shows an alternative embodiment that may be used for more precise pattern combinations than a mechanically assembled dual module head pair. FIG. 11 shows a compound substrate 80. As shown in FIG. 11, the compound substrate 80 has a first substrate 81 and a second substrate 83. The first and second substrates 81 and 83 are spaced apart a predetermined distance L by use of a first block 85 to separate the substrates. The first substrate includes a pre-erase gap 46 to DC erase a servo channel and the second substrate includes a servo pattern that is written in the DC pre-erased servo channel. As shown in FIG. 11, the pre-erase gap is ideally substantially the same width at the servo pattern. The pre-erase gap may have a slightly larger width than the width of the servo pattern. The first block 85 separating the compound substrate may be formed with ceramic. However, other materials may be used to separate the substrates. The substrates may be joined together using epoxy.

FIG. 11 shows a compound substrate 80 having a combination of a surface thin film head (of the type described in U.S. Pat. No. 6,269,533) and a low inductance surface thin film head (of the type described in U.S. Pat. No. 6,496,328). Also, while two substrates are joined together in FIG. 11, a compound substrate having more than two substrates is within the scope of the present invention.

The compound substrate in FIG. 11 may have all the gaps lithographically printed by a single mask and hence all patterns printed on those sub-gaps will have lithographic precision to the order of 0.1 microns or better. Hence, the compound substrate module may be used for more precise pattern combinations than a mechanically assembled dual module head pair.

Figure 4:
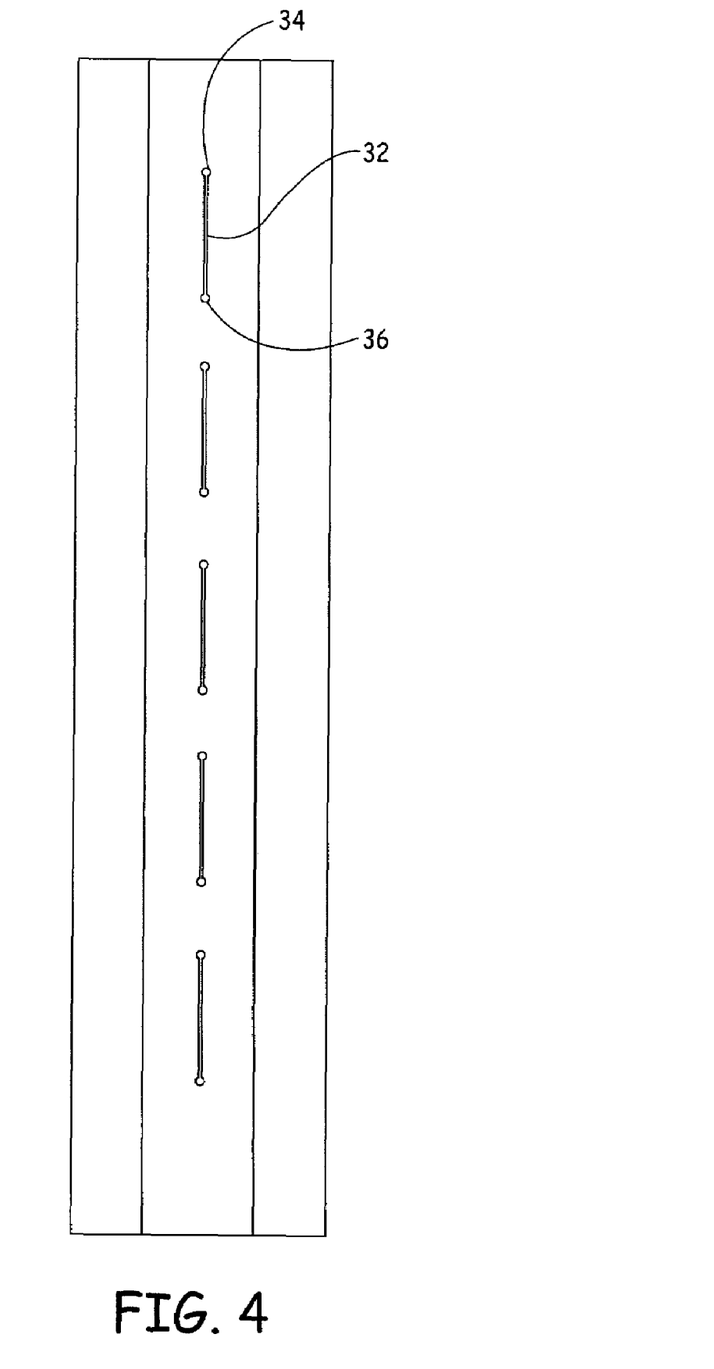
FIG. 4 shows an exemplary servo erase gap pattern on the surface of a surface film head.

The apparatuses discussed with respect to FIGS. 2 and 3 may contain various servo patterns where one of the patterns is for performing a DC pre-erase of a servo track 14. FIG. 4 shows an exemplary servo erase gap pattern on the surface of a surface film head. While the servo head itself of FIG. 5 may be used to pre-erase the tape 10 this would require a two pass operation which would be time inefficient. However that would be within the scope of the present invention.

Figure 5:
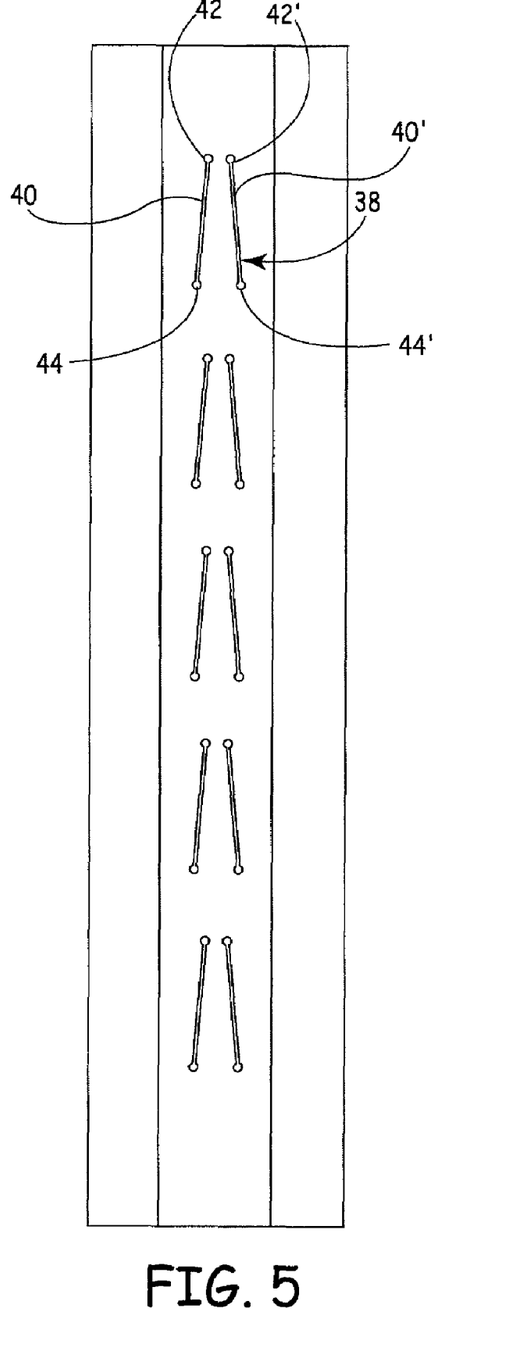
FIG. 5 shows an exemplary servo gap pattern on the surface of a surface film head that may be used to write a servo pattern in the servo channel on a magnetic tape.

FIG. 4 shows an exemplary servo erase gap pattern on the surface of a surface film head. The servo erase gap pattern 32 includes a first termination 34 and a second termination 36. The terminations 34, 36 may have curved portions. As shown in FIG. 4, the terminations 34 and 36 are circular. FIG. 5 shows an exemplary servo gap pattern on the surface of a surface film head that may be used to write a servo pattern in the servo channel 14 on a magnetic tape 10. FIG. 5 shows a servo gap pattern 38 that is time based. The servo gap pattern 38 has a first portion 40 and a second portion 40', with each portion 40, 40' having a first termination 42, 42' and a second termination 44, 44'. As with the pattern in FIG. 4, the terminations 42, 42', 44, 44' have curved portions, and as shown, have circular terminations. It will be appreciated that other types servo patterns may be used without departing from the scope of the present invention.

Figure 6:
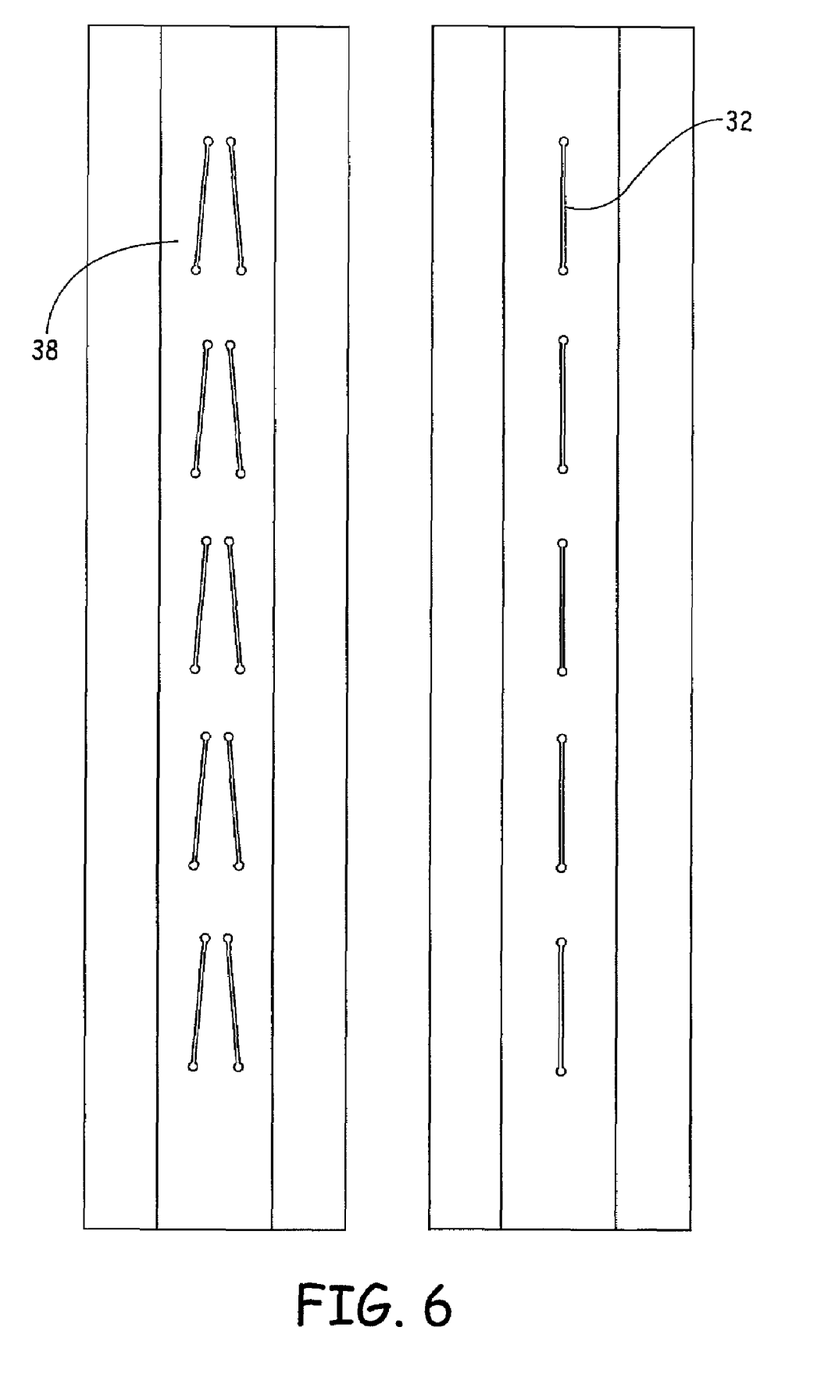
FIG. 6 shows a two head configuration in which one head has a gap pattern that would be used to DC pre-erase the servo channel and the other head has a timing based servo gap pattern that would write a timing based pattern onto the servo channel on a magnetic tape.
Figure 7:
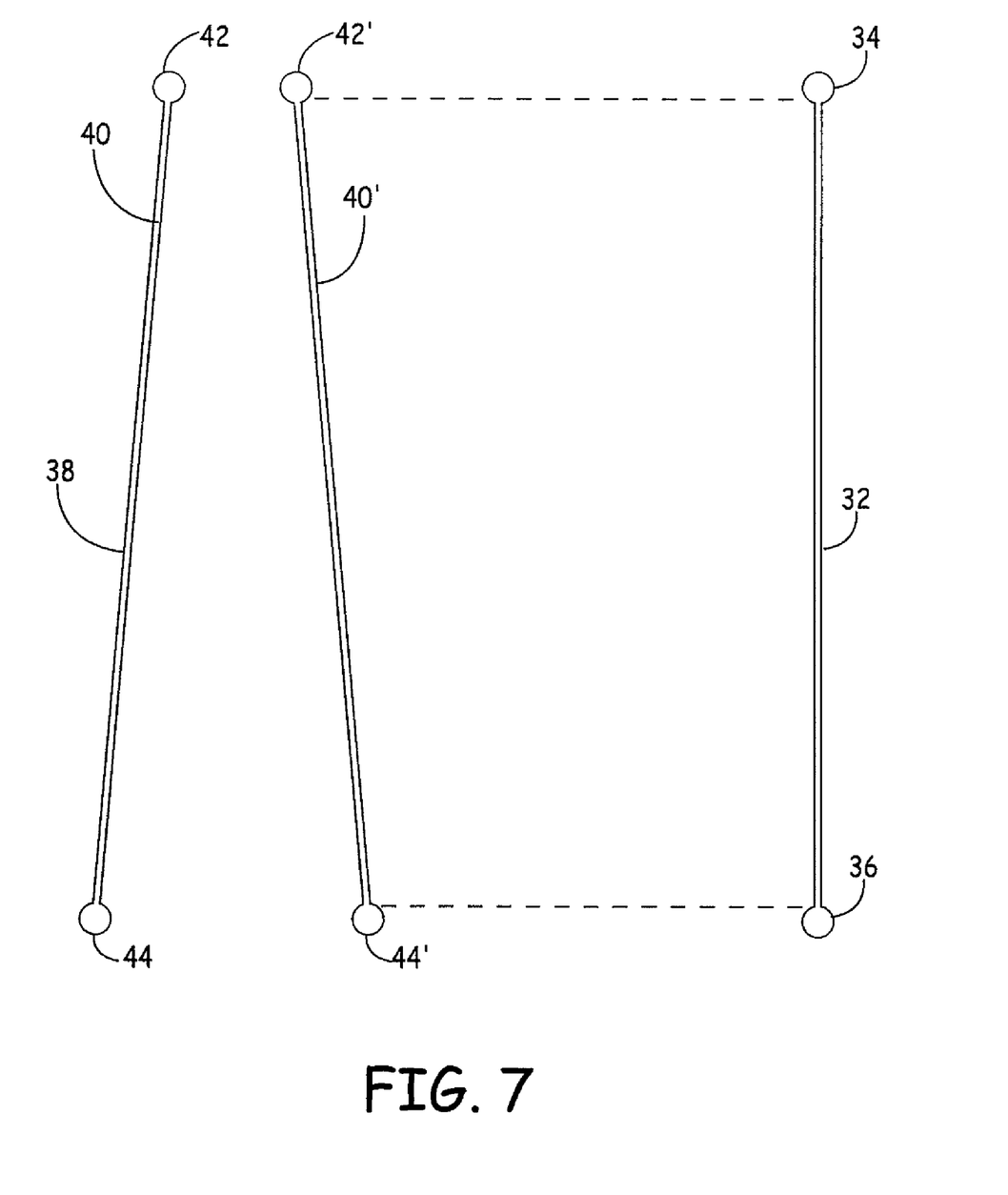
FIG. 7 shows a close-up of the patterns shown in FIG. 6. Note that the patterns are matched so that the erase track width is substantially the same as the servo track width.

FIG. 6 shows a two head configuration in which one head has a gap pattern 32 that would be used to DC pre-erase the servo channel and the other head has a timing based servo gap pattern 38 that would write a timing based pattern onto the servo channel on a magnetic tape 10. FIG. 7 shows a close-up of the patterns shown in FIG. 6. Note that the patterns are matched so that the erase gap track width is substantially the same as the servo gap track width. Such a configuration would allow the entire servo track 14 to be DC erased FIGS. 4-6 show each head having five patterns that may be used to perform a DC pre-erase. Such heads may have the same number of patterns to perform a pre-erase as the number of servo channels or servo tracks 14 contained on the magnetic tape 10.

Figure 8A:
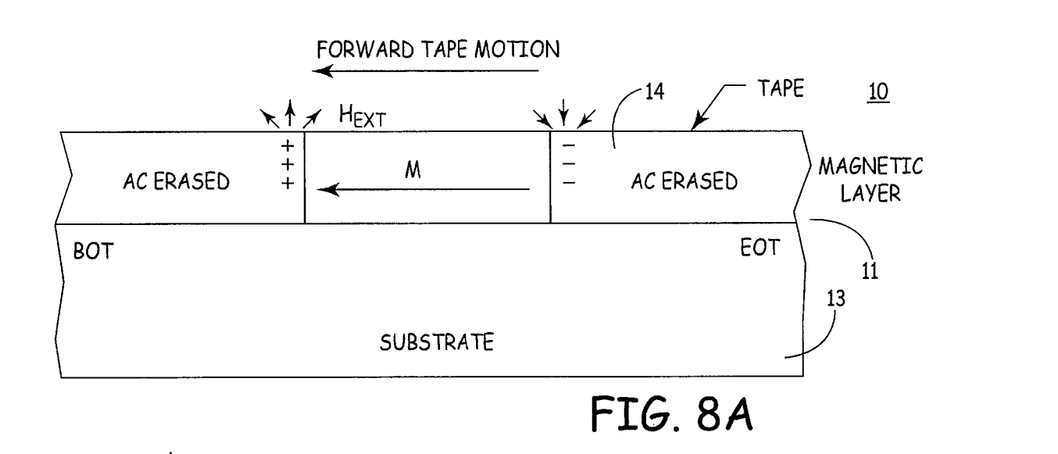
FIGS. 8A-8B show a portion of a magnetic layer and substrate of a magnetic tape and a theoretical output signal from a servo pattern on a magnetic tape in which the tape and servo channel have been AC erased.
Figure 8B:
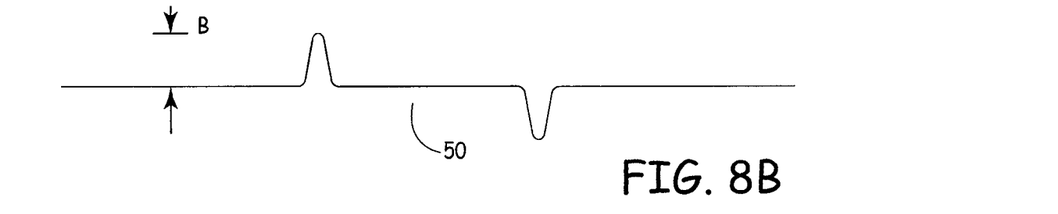

A pre-erase process may be performed during the production of magnetic tape in order to provide a stronger signal for reading the servo pattern. FIG. 8A shows magnetic tape 10 with servo track 14, wherein the servo track 14 has been AC erased but not DC erased. As shown in FIG. 8A, the magnetic tape 10 has a magnetic layer 11 and a substrate 13. The "M" stands for magnetization and shows that a portion 19 of the servo channel 14 is magnetized (e.g., by the writing of servo data). FIG. 8B shows the input signal 50 from a tape 10 as read by a read head of the servo pattern 14 in such a condition. The amplitude B indicates, at least in part, the strength of the signal 50.

Figure 8C:
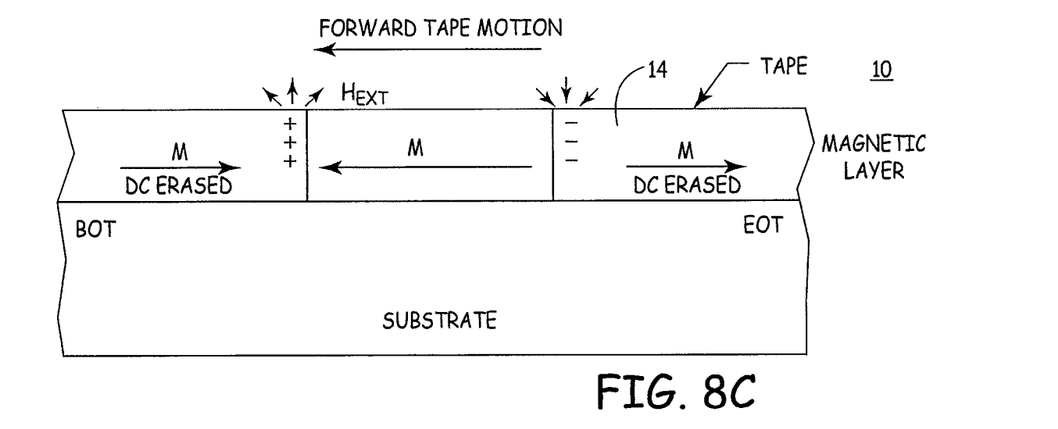
FIGS. 8C-8D show a portion of a magnetic layer and substrate of a magnetic tape and a theoretical output signal from a servo pattern on a magnetic tape in which the servo channel has been DC erased prior to recording the servo signal.
Figure 8D:
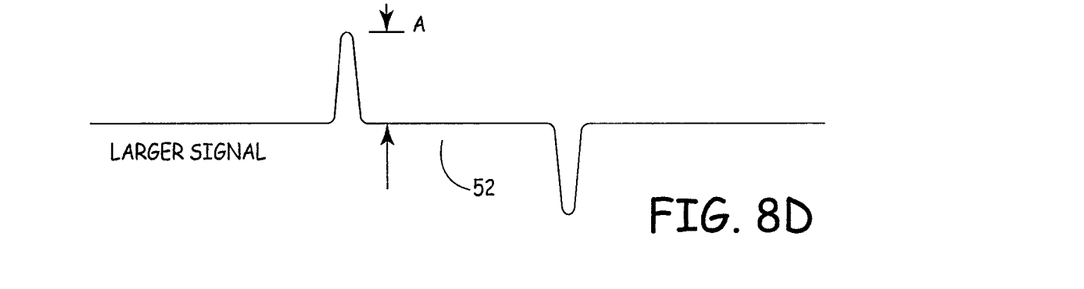

FIG. 8C shows magnetic tape 10 with servo track 14, wherein the servo track has been DC erased in accordance with the present invention. As in FIG. 8A, the servo channel 14 has be magnetized by the written servo data. However, unlike FIG. 8A, the portion of the servo channel adjacent the servo data has been DC pre-erased. FIG. 8D shows the input signal 52 from the tape 10 as read by the servo read head in such a condition. The amplitude C indicates the strength of the input signal 52 from the DC pre-erased servo channel is theoretically greater than the input signal 50 from the servo channel that was not DC pre-erased. A comparison of FIGS. 8B and 8D shows that, in theory, the input signal 52 from a DC pre-erased servo channel is greater than the input signal 50 from a servo channel that has not been DC pre-erased. In one embodiment, a DC pre-erased channel, in theory, would provide a servo read voltage signal twice as strong as an input signal from a servo channel that has not been DC pre-erased but which had been randomly erased.

Figure 9A:
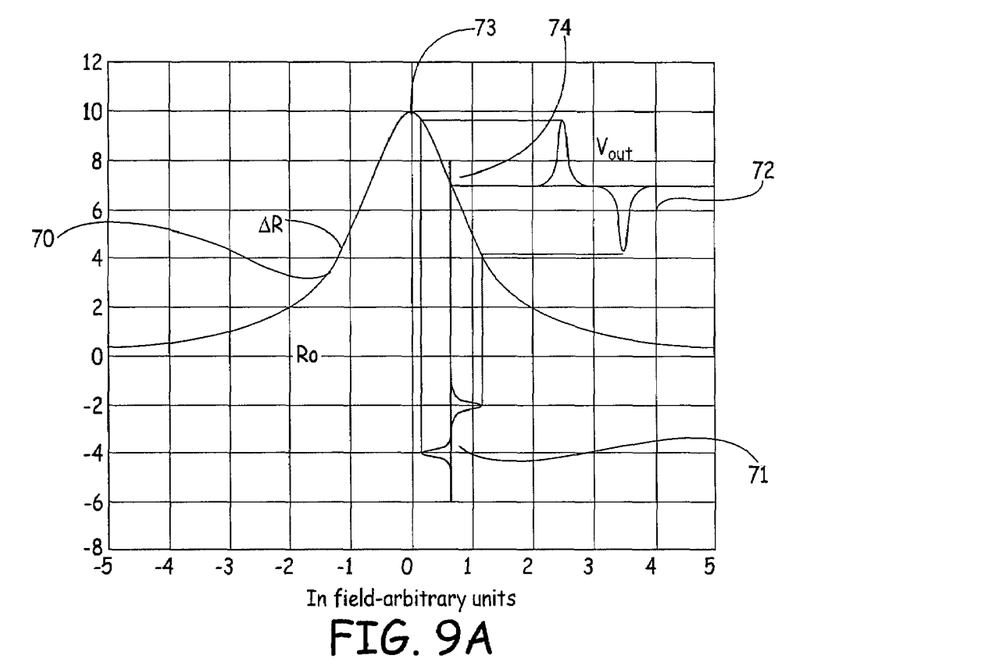
FIGS. 9A and 9B show theoretical waveforms for relating the magnetoresistive (MR) response curve of the head, an input field from the magnetic tape, and an output voltage signal from the MR head element.
Figure 9B:
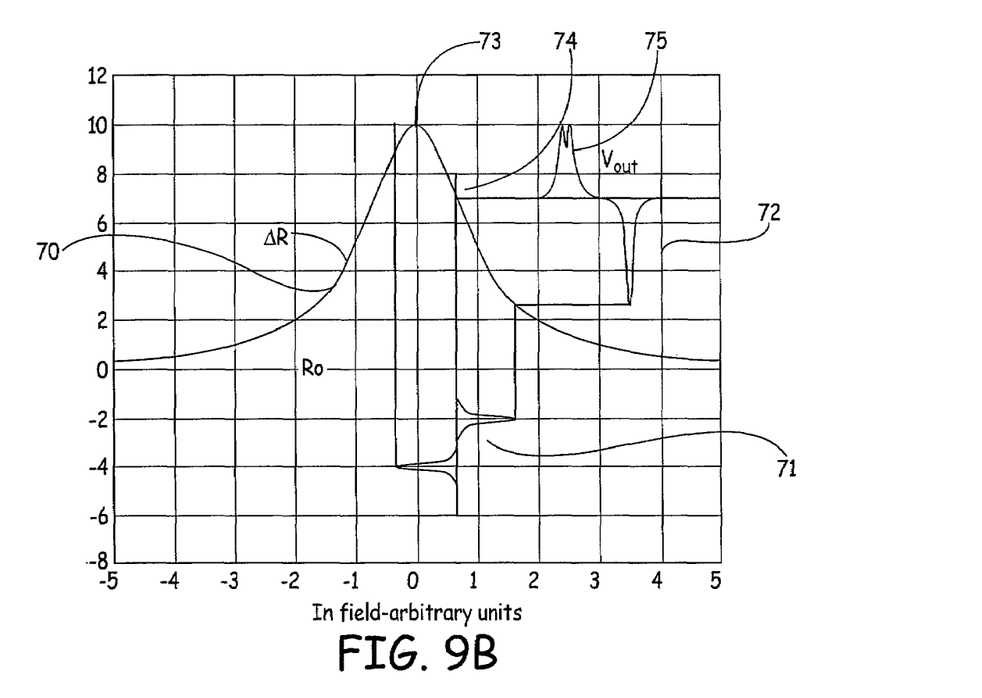

FIGS. 9A and 9B show a theoretical response curve 70 of the MR stripe, a theoretical input signal from a tape 71 and a theoretical output voltage 72. The response curve 70 includes a peak 73 and a portion that approximates a linear region 74. This response curve is sometime referred to the cosine squared response as the curve can be modeled as $\Delta R = (\Delta \rho/\rho) R \cos^2 \phi$. The angel $\phi$. being the angle between the resultant magnetization vector of the MR stripe and the applied current direction in the stripe. ($\Delta \rho/\rho$) is called the magnetoresistive coefficient of the material that makes up the stripe.

This response curve in turn leads to a voltage $\Delta V = I \Delta R$, where I is the bias current of the stripe. This discussion could equally apply to giant magnetoresistive ("GMR") materials where the response is similar but modeled as a cosine curve.

In general, the output voltage should correspond to a waveform shown in FIG. 9A in which the input signal is within the linear region of the response curve. However, as shown in FIG. 9B, when the output voltage has a "rabbit ears" 75, that the input signal extends outside the linear region and, as shown, to the negative slope of there response curve.

This condition is not desired. As such, the DC pre-erase must be such that the signal output remains within the liner region of the response curve. As such, the present invention when used appropriately allows for greater voltages of the input signal while still remaining in the linear region of the response curve.

Also, in general, the MR read sensor output voltage is a function of the thickness of the magnetic tape. To achieve higher linear recording densities the tape thickness is generally decreased to maintain magnetic bit cell stability. Hence the servo read signals may need to be increased as tape thickness decreases. As such, under proper conditions, and assuming certain system parameters of higher density recordings, performing a DC pre-erase of a servo channel enables a stronger signal to be read without going into the non-linear region of the MR read elements response curve.

In practical operation, a dual head system consisting of a servo write head and servo DC erase head would be used in making magnetic tape. The servo DC erase will erase only that part of the medium upon which will be recorded the servo format signal. For all practical purposes, the DC erase head track widths and the servo format head track widths would be the same and they would be matched up within certain engineering tolerances. That is, the magnetic tape would only be DC erased in the servo track region and not in the data track regions. This is because data zones should remain ideally AC erased so that the subsequent data written thereupon will have the highest possible signal-to-noise ration and the data will not be biased by the underlying DC erasure.

In principle one could wipe the entire tape width with a DC erase and achieve the same result on the servo track, however that may compromise the subsequently recorded data in the data track areas. Hence, while one could use a full tape width DC erase head this would not be preferred method for reasons that go beyond the scope of this document.

During manufacture, the magnetic tape would move in a transducing direction over the heads. The servo channel of the magnetic tape is first pre-erased, and then a servo pattern is written in the servo channel 14 (see FIG. 1). The resulting magnetic tape 10 would have a pre-aligned magnetization of the opposite polarity to that of the servo signal.

The dual module head system on one mount, the dual heads on separate individual mounts or the compound substrate head may be used to enable this concept. This concept can apply to timing based servo systems, amplitude based systems or a combination of both in some more advanced servo system. The concept will be most effective when the servo write system is uni-polar in nature and when the DC pre-erase is made using the opposite polarity.

In that the foregoing description of the present invention discloses only exemplary embodiments thereof, it is to be understood that other variations are contemplated as being within the scope of the present invention. Accordingly, the present invention is not limited in the particular embodiments which have been described in detail therein. Rather, reference should be made to the appended claims as indicative of the scope and content of the present invention.

The invention claimed is:

1. A method for making a magnetic media, the method comprising:
   pre-erasing at least one servo channel of the magnetic media, without direct current pre-erasing the data channels of the magnetic media, by applying a unipolar direct current; and
   writing a servo pattern by applying a direct current of substantially opposite polarity of the erasing current.

2. The method of claim 1, wherein the pre-erasing and the writing is performed using a compound magnetic recording head.

3. The method of claim 2, wherein the compound magnetic recording head comprises:
   a first head comprising a magnetically permeable thin film layer comprising an erase gap pattern for pre-erasing a servo track of a magnetic media; and
   a second head comprising a magnetically permeable thin film layer comprising a servo write gap pattern for writing a servo pattern in the servo track.

4. The method of claim 3, wherein the erase gap pattern of the first head and the servo write gap pattern of the second head are lithographically printed using a single mask.

5. The method of claim 4, wherein pre-erasing at least one servo channel is performed by passing a portion of the magnetic media over the erase gap pattern of the first head and writing a servo pattern is performed by then passing a portion of the magnetic media over the servo write gap pattern of the second head.

6. The method of claim 5, wherein the servo write gap pattern of the second head is a timing-based servo pattern.

7. The method of claim 5, wherein the servo write gap pattern of the second head is an amplitude-based servo pattern.

8. The method of claim 1, wherein prior to pre-erasing at least one servo channel of the magnetic media, the magnetic media is alternating current erased.

* * * * *